Nov. 20, 1934.  J. G. WINSOR  1,981,443
TRAILER HITCH
Filed June 19, 1933   2 Sheets-Sheet 2
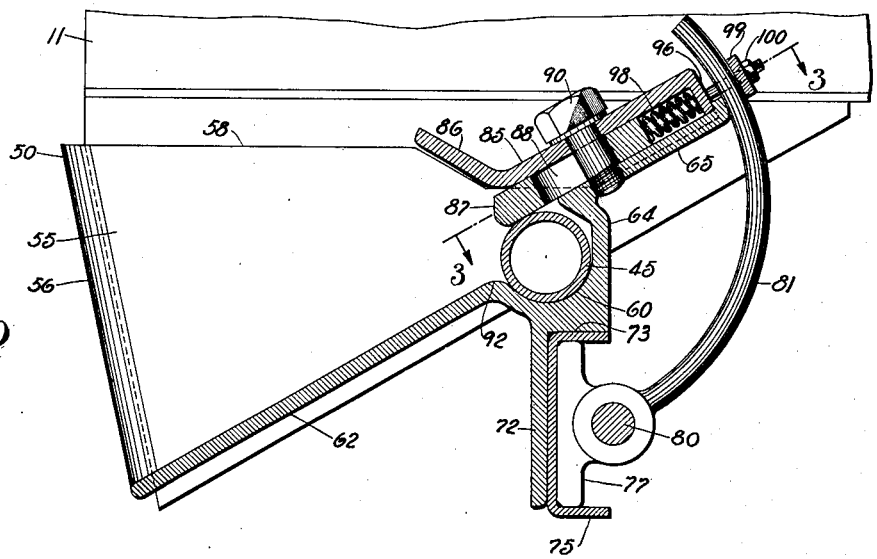
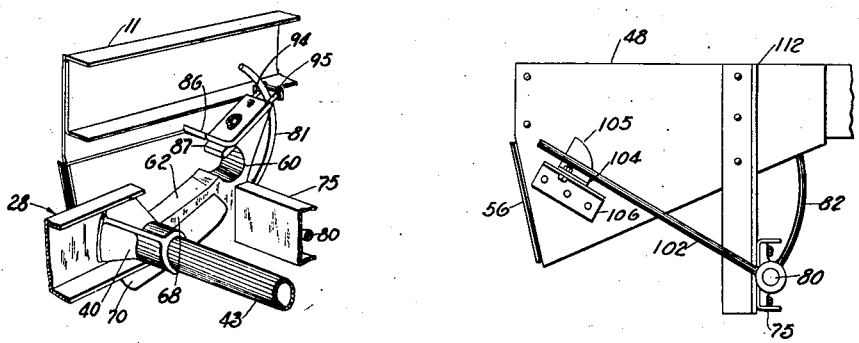
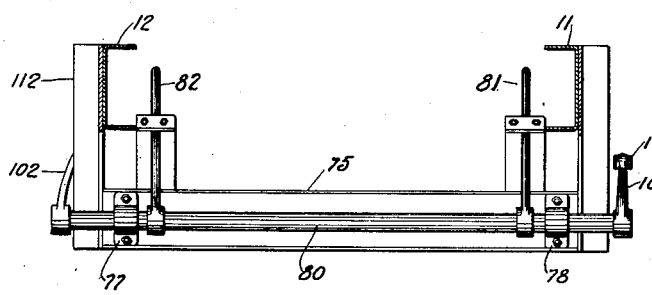
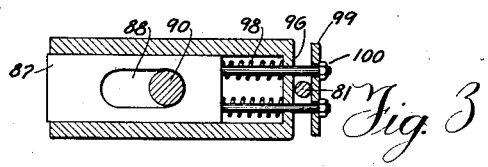
INVENTOR.
BY James G Winsor
P. W. Pomeroy
ATTORNEY Patented Nov. 20, 1934

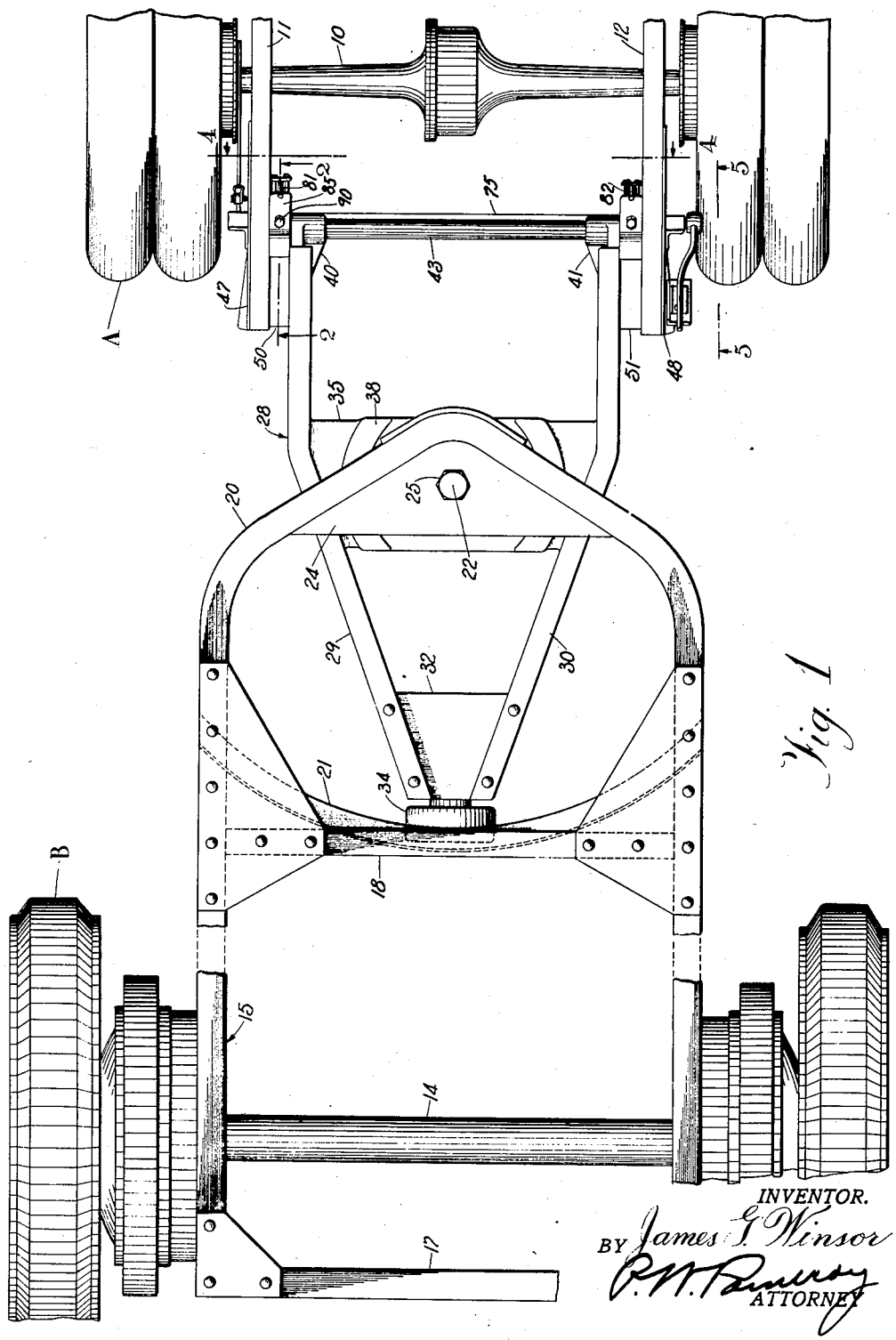

1,981,443

UNITED STATES PATENT OFFICE 1,981,443

TRAILER HITCH

James G. Winsor, Ann Arbor, Mich.

Application June 19, 1933, Serial No. 676,426

5 Claims. (Cl. 280—33.15)

This invention relates to improvements in trailer hitches, and has for its principal object the provision of a device by means of which a trailer may be quickly and conveniently secured to an automotive tractor or truck.

A further object of the invention lies in the provision of a device of the character described which is applicable to a four-wheel trailer or a two-wheel semi-trailer.

A still further object lies in the provision of a device of the character described whereby the trailer may be connected to or disconnected from an automotive truck or tractor without disturbing the king-pin of the trailer hitch.

An additional object lies in the provision in combination with a trailer hitch of the character described of guide means for quickly and positively guiding the separable elements into locking position and of latching means which automatically engages the separable elements and rigidly secures them together and which at the same time is easily releasable to permit disengagement of the separable elements.

It is also an object of the invention to provide a device of the character described which is simple and economical to manufacture, easy to install and use, and which is so studily constructed as to not readily get out of order in use.

Other objects and advantages of the invention will appear as the description proceeds.

The accompanying drawings illustrate an acceptable mechanical embodiment of the idea of the invention. The drawings, however, are not to be taken as limiting the invention, the scope of which is to be measured entirely by the scope of the sub-joined claims.

In the drawings:

Figure 1 is a top plan view of the rear end of an automotive truck or tractor and the front end of a trailer, showing a trailer hitch constructed according to the idea of this invention interconnecting the tractor and trailer.

Figure 2 is a vertical sectional view taken on the line 2—2 of Figure 1.

Figure 3 is a sectional view taken on the line 3—3 of Figure 2.

Figure 4 is a sectional view taken on the line 4—4 of Figure 1.

Figure 5 is an elevational view of the rear end of a tractor frame as indicated by the line 5—5 of Figure 1, showing the device of my invention applied thereto.

Figure 6 is a perspective view showing certain of the details of the construction of the guide and latch mechanism of my improved trailer hitch.

Referring to the drawings in detail, A indicates an automotive truck or tractor and B indicates a load carrying trailer adapted to be drawn by the truck or tractor A. The tractor is provided with a rear axle as indicated at 10 and a frame comprising longitudinal side frame members 11 and 12, and cross members, not illustrated.

The trailer B is provided with an axle 14 upon which is supported a frame generally indicated at 15 having longitudinally extending side frame members connected together by cross members 17 and 18 and a yoke 20. The forward cross member 18 carries an arcuate track 21 having its center at a point 22 located in a plate 24 carried by the yoke 20. The plate 24 is provided with an aperture surrounding the point 22 and a king-pin 25 projects downwardly through this aperture.

A fabricated A-frame member generally indicated at 28 constitutes the tractor connection between the tractor A and the trailer B. This A-frame member comprises leg elements 29 and 30 inclned toward each other at the rear and extending parallel to each other at the forward end of the A-frame member. The rearward end of the leg elements 29 and 30 are connected together by a plate 32 which carries a bearing, not shown, in which is journaled an axle carrying a roller 34 adapted to roll in the arcuate track 21 when the tractor A turns relative to the trailer B. At the junction of the inclined and parallel portions of the leg elements 29 and 30, the A-frame member is provided with a cross plate 35 which carries upon its upper surface a trunnion or fifth-wheel 38 through which the king-pin 25 extends to provide a pivotal connection between the A-frame 28 and the trailer frame 15.

Similar castings 40 and 41 are secured to the forward end of the elements 29 and 30 respectively of the A-frame member, and these castings 40 and 41 are provided with apertured bosses through which extends a tubular cross member 43, the ends of which project beyond the leg elements as indicated at 45 in Figure 2.

The side frame members 11 and 12 of the tractor A are preferably of channel section as illustrated in Figure 6, and similar gusset plates 47 and 48 are secured by riveting, welding, or other suitable means to the outer vertical side of the rear end of each of the side frame members 11 and 12 respectively.

Referring to Figure 5, it will be observed that the gusset plates each comprise a portion rectangular in form overlying a portion of the rear end of each of the side frame members and a portion triangular in form projecting below the respective side frame member.

To the triangular portion of each of the gusset plates 47 and 48 is secured by riveting, welding, or other suitable means, a guide casting particularly illustrated in Figures 2 and 6, the guide casting secured to the plate 47 being indicated at 50 and the guide casting secured to the plate 48 being indicated at 51 in Figure 1. The guide castings 50 and 51 are similar in all respects except that one is right hand and the other is left hand. It is, therefore, believed that a description of the guide casting 50 illustrated in Figures 2 and 6 is sufficient for the purpose of this disclosure.

This guide casting comprises a substantially triangular vertical wall portion 55, the wider end of which is flared outwardly around the rear end of the triangular portion of the plate 48 as indicated at 56 in Figures 2 and 5. The top edge of the vertical wall portion 55 is substantially horizontal as indicated at 58 in Figure 2, and the bottom portion thereof is inclined upwardly from the rear end of the casting to a substantially semi-cylindrical pocket indicated at 60. An inwardly extending flange 62 extends along the inclined bottom edge of the wall portion 55 and is depressed downwardly to form the semi-cylindrical pocket 60, then extends vertically upward to form the abutment 64 and from the top of the abutment 64 extends substantially parallel to the bottom edge of the wall portion 55 which is illustrated as being adjacent to the lower edge of the side frame member 11 to provide a base 65 for a latch mechanism to be later described. As illustrated in Figure 6, the casting 50 is provided with a wall portion 68 from which an additional flange member 70 extends inwardly to provide an additional guide for the corresponding end of the A-frame member.

Referring again to Figure 2, it will be observed that the casting 50 is provided beneath the semi-cylindrical pocket 60 with a downwardly extending projection 72 and a horizontal shoulder 73. The casting 50 is secured to a cross member 75 which carries at each end thereof brackets 77 and 78 as particularly illustrated in Figure 4. These brackets are provided with apertures, the axes of which are parallel to the cross member 75, and a shaft 80 is rotatably mounted in the apertures. Rigidly secured to the shaft 80 adjacent to the opposite ends thereof are similar curved arms 81 and 82, the arm 81 as illustrated in Figure 2 extending upwardly past the upper end of the extension 65 of the flange 62.

A flange member 85 having an upturned end 86 is positioned upon the upper surface of the extension 65 in a manner to provide a rectangular space, open at its lower end, between the member 65 and the member 85. A latch tongue 87 provided with a centrally located, elongated aperture 88 is slidably mounted between the extension 65 and the member 85, and a stud bolt 90 projects through an aperture in the member 85, through the aperture 88 in the latch tongue 87, and into a screw-threaded aperture in the extension 65 to secure these elements together in operative relation. Although I have shown a stud bolt 90, it is sometimes desirable to use a standard bolt having a nut thereon to more securely clamp the flange member 85 on to the member 65. As illustrated in Figure 2, the lower end of the latch tongue 87 projects downwardly over the pocket 60 and the distance between the lower end of the latch tongue and the ridge 92 which forms the edge of the pocket 60 is less than the diameter of the projecting end portion 45 of the tubular cross member 43. A pair of pins 94 and 95 are secured to the upper end of the latch tongue 87 and project through the rear flange 96 of the member 85. A compression spring as indicated at 98 surrounds each of these pins between the upper end of the latch tongue 87 and the rear flange 96 of the member 85 to resiliently urge the latch tongue 87 to the locking position illustrated in Figure 2. The pins 94 and 95 extend beyond the rear flange 96 and at their extremities carry a plate or cross member 99 secured on the pins by means of nuts as indicated at 100 in Figure 2 threaded upon the screw-threaded ends of the pins. The curved arm 81 extends between the pins 94 and 95 and between the upper extremity of the extension 65 and the plate 99, and it will be observed from this description that rotation of the shaft 80 to swing the curved arms 81 and 82, by reason of the above described connection between these arms and the latch tongue, will move the latch tongue out of locking engagement with the projecting ends of the tubular cross member 43. As illustrated in Figure 2, it will be observed that the upwardly bent end portion 86 of the member 85 forms the top of a substantially funnel-shaped guide adapted to direct the projecting end of the tubular cross member 43 into the pocket 60 and behind the lower end of the latch tongue 87.

The shaft 80 projects at its ends beyond the planes of the gusset plates 47 and 48 and as illustrated in Figure 5 carries at one end a manually actuatable lever 102 by means of which the shaft may be rotated from a position adjacent to the rear end of the tractor or truck to cause the arms 81 and 82 to release the latch tongue from engagement with the cross member 43. A catch 104 comprising a cam member 105 secured to an angle iron 106 riveted or otherwise secured to the gusset plate 48 is provided to normally hold the lever arm 102 in its inoperative position. At the end opposite the lever 102 the shaft 80 carries an arm 108 which is operatively connected by means of a linkage system indicated at 110 to a control device, not illustrated, located in the cab of the truck or tractor so that the locking means may be conveniently released from the cab. As illustrated in Figure 4, to each of the gusset plates 47 and 48 is secured by riveting, welding, or other suitable means, a perpendicular angle iron, one of which is indicated at 112 and to which is permanently secured the channel member 75, to thus provide a rigid cross member for the rear end of the tractor frame and a support for the entire load of the front end of the trailer B. This rigid support is also strengthened by the guide castings 50 and 51 which are permanently secured to the channel 75 and the gusset plates 47 and 48.

The operation of the device is substantially as follows:

Assuming that the tractor and trailer are disengaged and it is desired to engage the same, the forward end of the A-frame member 28 which is at all times operatively secured to the trailer frame 15 is raised to a level at which the lower end of the flanges 62 of the guide castings 50 and 51 will pass beneath the lower surfaces of the projecting ends of the tubular cross member 43. The tractor is then backed up relative to the trailer and the projecting ends of the cross member 43 will be guided transversely by the vertical wall portion 55 and guided upwardly by the flange 62 and the flange extension 70 into the semi-cylindrical pocket 60 of each guide member. As the ends of the cross member pass over the ridge, as indicated at 92 in Figure 2, of the guide castings, they will engage and force upwardly the latch tongues, one of which is indicated at 87 in Figure 2. As soon as the projecting ends of the cross member 43 have passed over the ridges as indicated at 92 and dropped into the semi-cylindrical pockets as indicated at 60, the latch tongues as indicated at 87 will be forced downwardly by the springs as indicated at 98 to lock the cross member in the pocket as clearly illustrated in Figure 2. The trailer is then operatively connected to the tractor to follow the tractor but is prevented from swaying relative thereto. If it is now desired to release the trailer from the tractor, either the arm 108 is actuated from the cab or the arm 102 is actuated from a position adjacent to the rear end of the tractor, to rotate the shaft 80 and swing the arms 81 and 82 to pull the latch tongues out of engagement with the projecting ends of the cross member 43. With the latch tongues in disengaged position, the tractor may now be moved forwardly and the projecting ends of the cross member 43 will be pulled out of the pockets formed in the guide castings 50 and 51 and the tractor will then be free of the trailer. The arm 108 or 102 is then moved to bring the arms 81 and 82 back to the position illustrated in Figure 2 so that the latch tongue will again be in position to automatically engage the projecting ends of the cross bar 43 when it is again desired to connect the tractor to the trailer.

While I have described a preferred mechanical embodiment of the idea of my invention in such clear and exact terms that the same may be readily understood by others skilled in the art, it is to be understood that I do not limit the invention to the exact form illustrated and described and that such changes in the size, shape and arrangement of parts may be resorted to as come within the scope of the sub-joined claims.

What I desire to secure by Letters Patent is as follows:

1. In a trailer hitch adapted to operatively connect an automotive truck or tractor to a load carrying trailer, wherein said tractor is provided with a frame comprising a pair of longitudinally extending side members, and a connecting member is pivotally secured to the front end of said trailer, a cross member secured to the front end of said connecting member having its ends projecting beyond the lateral limits of said connecting member, a gusset plate secured to the rear end of each of said tractor frame side members and projecting below the same, a guide casting secured to the rear end of each of said tractor frame side members by said gusset plates, a pocket in each of said guide castings adapted to receive the corresponding end of said cross member, an inclined flange on said guide casting adapted to guide the ends of said cross member into said pockets, and manually releasable latching means for retaining the ends of said cross member in said pockets.

2. In a trailer hitch adapted to operatively connect an automotive truck or tractor to a load carrying trailer, wherein said tractor is provided with a frame comprising longitudinally extending side members, a connecting member pivotally secured to the front end of said trailer, a cross member secured to said connecting member having its ends projecting beyond the lateral limits of said connecting member, a guide casting secured to the rear end of each of said tractor frame side members, a pocket in each of said guide castings adapted to receive the corresponding projecting end of said cross member, an inclined flange on said guide casting adapted to guide the end of said cross member into said pockets, a latch tongue carried by each of said guide castings adapted to normally maintain the ends of said cross member in said pockets, and spring means urging said latch tongues into locking position, whereby the projecting ends of said cross member will be automatically locked in said pockets as soon as said projecting ends pass the lower ends of said latch tongues.

3. In a trailer hitch adapted to operatively connect an automotive truck or tractor to a load carrying trailer, wherein said tractor is provided with a frame comprising a pair of longitudinally extending side members and a connecting member is pivotally secured to the front end of said trailer, a cross member secured to said connecting member having its ends projecting beyond the lateral limits of said connecting member, a guide casting secured to the rear end of each of said tractor side frame members, a pocket in each of said guide castings adapted to receive the corresponding projecting end of said cross member, spring pressed latch tongues adapted to automatically lock the projecting end of said cross member in the pocket in said guide casting, a shaft rotatably mounted below said guide castings, lever arms on said shaft for manually rotating the same, and curved arms on said shaft for moving said latch tongues out of engagement with the projecting ends of said cross member when said shaft is manually rotated.

4. In a trailer hitch adapted to operatively connect an automotive truck or tractor to a load carrying trailer, wherein said tractor is provided with a frame comprising longitudinally extending side members and a connecting member is pivotally secured to the front end of said trailer, a cross member secured to said connecting member having its ends projecting beyond the lateral limits of said connecting member, a gusset plate secured to the rear end of each of said tractor side frame members, a guide casting secured to the rear end of each of said tractor side frame members by the corresponding gusset plate, a pocket in each of said guide castings adapted to receive the corresponding projecting end of said cross member, a latch tongue slidably mounted on each guide casting to normally lock the projecting end of said cross member in the corresponding pocket in said guide casting, a second cross member secured to said gusset plates and guide castings, extending below the same transversely of said tractor frame, a shaft rotatably mounted on said cross member, lever arms on said shaft for manually rotating the same, and curved arms on said shaft engaging with said latch tongues for moving the same out of engagement with the projecting ends of said first cross member when said shaft is manually rotated.

5. In a trailer hitch adapted to operatively connect an automotive truck or tractor to a load carrying trailer, a connecting member pivotally secured to said trailer, a cross member secured to said connecting member having its ends projecting beyond the lateral limits of said connecting member, a pair of guide castings secured to the rear end of said tractor, pockets in said castings having a depressed semicircular portion adapted to receive the projecting ends of said cross member, inclined flanges on said guide castings adapted to guide the projecting ends of said cross member into said pockets, and a slidably mounted latch tongue carried by each guide casting adapted to lock the respective ends of said cross member in the pocket provided in the guide casting.

JAMES G. WINSOR.